(12) United States Patent
Goto et al.

(10) Patent No.: US 8,800,592 B2
(45) Date of Patent: Aug. 12, 2014

(54) FLOW CONTROL DEVICE

(75) Inventors: Takao Goto, Mie (JP); Toshihiro Aono, Hitachinaka (JP); Tetsuroh Kawai, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 483 days.

(21) Appl. No.: 13/253,495

(22) Filed: Oct. 5, 2011

(65) Prior Publication Data
US 2012/0247584 A1    Oct. 4, 2012

(30) Foreign Application Priority Data

Apr. 1, 2011  (JP) .................................. 2011-81901
Sep. 13, 2011  (JP) ................................ 2011-199150

(51) Int. Cl.
*G07D 7/06*    (2006.01)

(52) U.S. Cl.
USPC ....... 137/486; 137/487.5; 73/202.5; 700/282; 702/45; 702/100

(58) Field of Classification Search
USPC ........... 137/486, 487.5; 73/202.5; 702/45, 49, 702/100; 700/282
See application file for complete search history.

(56) References Cited

U.S. PATENT DOCUMENTS

| | | | | |
|---|---|---|---|---|
| 5,062,446 A | * | 11/1991 | Anderson | 137/486 |
| 5,303,731 A | * | 4/1994 | Vavra et al. | 137/486 |
| 5,470,045 A | * | 11/1995 | Kazama et al. | 251/129.15 |
| 5,911,238 A | * | 6/1999 | Bump et al. | 137/487.5 |
| 6,389,364 B1 | * | 5/2002 | Vyers | 702/45 |
| 7,140,384 B2 | * | 11/2006 | Kang et al. | 137/487.5 |
| 7,272,512 B2 | * | 9/2007 | Wang et al. | 702/45 |
| 7,380,564 B2 | * | 6/2008 | Lull et al. | 137/486 |
| 7,826,986 B2 | * | 11/2010 | McDonald | 700/282 |
| 8,036,780 B2 | * | 10/2011 | Gotoh | 700/282 |
| 8,356,623 B2 | * | 1/2013 | Isobe et al. | 137/486 |

FOREIGN PATENT DOCUMENTS

| | | |
|---|---|---|
| JP | 9-171412 A | 6/1997 |
| JP | 2001-147723 A | 5/2001 |
| JP | 2002-41149 A | 2/2002 |

* cited by examiner

*Primary Examiner* — Eric Keasel
(74) *Attorney, Agent, or Firm* — Sughrue Mion, PLLC

(57) ABSTRACT

In a flow control device 100, a comparator 40 outputs a first control voltage Vref based on a comparison of an instruction value signal Vi1 of the flow volume and a signal Vi2 according to the sensor output signal Vs. A feedback current generator 30 generates a feedback current Ifb according to a difference between the sensor output signal Vs and a signal Vi2 according to the instruction value signal Vi1. A feedback voltage generator 50 is a resister. A feed forward current generator 20 generates a feed forward current Iff according to the instruction value signal Vi1. A synthesis unit 60 generates a second control voltage Vdrv* obtained by adding to the feedback voltage Vfb a voltage according to a sum of the feedback current Ifb and the feed forward current Iff. The valve unit 90 is controlled according to the first and the second control voltage Vref, Vdrv*.

8 Claims, 8 Drawing Sheets

_US 8,800,592 B2_

FLOW CONTROL DEVICE

CROSS-REFERENCE TO RELATED APPLICATIONS

The present application claims the priority based on Japanese Patent Applications No. 2011-81901 filed on Apr. 1, 2011 and No. 2011-119150 filed on Sep. 13, 2011, the disclosure of which is hereby incorporated by reference in its entirety.

BACKGROUND

1. Technical Field

The present invention relates to a flow control device for supplying a specified mass flow volume of a gas or the like for a semiconductor manufacturing process or the like, and particularly to the improvement of the responsiveness of a flow control device.

2. Related Art

Typically, a flow control device is used for supplying a specified mass flow volume of gas or the like for a semiconductor manufacturing process or the like. With this kind of flow control device, a flow volume sensor and control valve are provided in the flow path in which the gas or the like flows. Then, the detection value of the flow volume sensor is compared with a flow volume setting signal, and the valve opening degree of the control valve is controlled based on the difference between these two. With the semiconductor manufacturing process, the responsiveness of the flow control device has a significant effect on semiconductor manufacturing productivity. Various improvements of the responsiveness of the flow control device have been made in the past for flow control devices.

For example, with the flow control of the technology in Unexamined Patent Publication No. 2001-147723, when the flow volume set value is changed, an initial voltage that is slightly smaller than the control valve drive voltage found from the deviation between the flow volume setting signal and the flow volume sensor detection value is applied to the control valve, and immediately thereafter, this shifts to velocity type PID control. Then, with this method, it is possible to set to a desired flow volume quickly without the overshoot.

Also, the mass flow controller of Unexamined Patent Publication No. 2002-41149 is provided in the flow path in which the fluid flows, a flow volume sensor provided in the flow path, and a PID circuit that outputs control signals for controlling the control valve so that the measured value according to the flow volume sensor is the set value according to the flow volume setting signal. The mass flow controller is provided with a response improvement circuit that outputs a correction signal to the PID circuit during the time from when the flow volume setting signal is input until the flow volume sensor detects the flow of the fluid. The mass flow controller with such features improves the responsiveness of the flow control device.

Furthermore, the valve control device of Unexamined Patent Publication No. H09-171412 has: a first calculation means for calculating the optimal valve opening degree from the set flow volume and the feed forward calculation formula; a comparison means for comparing the actual flow volume detected by the flow volume detection means and the set flow volume and finding the deviation between them; a second calculation means for performing PID control calculation based on the deviation obtained by the comparison means; and a third calculation means for adding the calculation results of the first calculation means and the calculation results of the second calculation means. Also, the control responsiveness becomes faster by obtaining the optimal valve opening degree using the feed forward calculation formula, and it is possible to add fine tuning by finding a correction volume for the optimal valve opening degree using the PID control calculation.

With the technology noted in Unexamined Patent Publication No. 2001-147723, the responsiveness of the flow control when the flow volume set value is changed is improved. However, since the PID control remains dominant. Accordingly, the increase in the response speed is insufficient.

With the technology noted in Unexamined Patent Publication No. 2002-41149, by providing a response improvement circuit that outputs correction signals to the PID circuit, flow control is improved. However, a huge number of manhours is required to adjust the size of the correction signal and the threshold value that regulates the length of time that the correction signal is output. This is because since the correction signal controls the control valve via the PID circuit, if the PID gain changes, the correction signal size or threshold value must be readjusted.

With the technology noted in Unexamined Patent Publication No. H09-171412, the feed forward calculation output results are always applied even during control. Accordingly, when adjusting the feed forward parameter and feedback parameter to realize optimal control responsiveness, the correlation between both parameters has to be considered and adjusted. Specifically, when either the feed forward parameter or the feedback parameter is changed, this has an effect on the other parameter. Accordingly, there was the problem that it takes time to adjust the feed forward parameter and the feedback parameter.

The improvements in responsiveness and the problem of balancing feedback control and feed forward control described above are not limited to flow control with a mass flow meter used with the semiconductor manufacturing process, but exist with various fluid flow controls.

SUMMARY

[Aspect 1]

A flow control device, comprising:

a valve unit that controls a flow of a fluid inside a flow path;

a flow volume sensor that outputs a sensor output signal according to a flow volume of the fluid;

a comparator that receives (i) an instruction value signal expressing the instruction value of the flow volume of the fluid as a first input signal and (ii) a signal according to the sensor output signal as a second input signal, and outputs a first control voltage based on a comparison of the first and second input signals;

a feedback current generating unit that generates a feedback current according to a difference between (i) the sensor output signal or a signal according to the sensor output signal and (ii) a signal according to the instruction value signal;

a feedback voltage generating unit that generates a feedback voltage according to the feedback current;

a feed forward current generating unit that generates a feed forward current according to the instruction value signal; and a synthesis unit that generates a second control voltage that is a voltage obtained by adding to the feedback voltage a voltage according to a sum of the feedback current and the feed forward current, wherein the valve unit is controlled according to the first control voltage and the second control voltage.

With this aspect, the valve unit is controlled according to a second control voltage including a feed forward component.

Accordingly, compared to the aspect for which feed forward control is not performed, it is possible to improve the flow response speed after the change of the instruction value signal.

Also, with the present aspect, the feed forward current is generated separately from the feedback current and the feedback voltage. Then, a second control voltage is generated by adding the voltage reflecting the component due to the feed forward current and the feedback voltage according to the feedback current. Specifically, the feed forward component and the feedback component do not mutually affect each other when being generated. Accordingly, when generating the drive voltage that controls the valve unit, mutual adjustment of the feed forward component and the feedback component is not necessary. Also, settings for generating the feed forward current are not affected by settings for feedback. Consequently, settings for generating the feed forward current according to the instruction value are easy.

Thus, with the aspect noted above, it is possible to realize a flow control device with good responsiveness using few adjustment manhours.

Note that with the mode noted above, the "fluid" can be a gas and can also be a liquid.

Also, the "signal B according to signal A" can be a signal B for which signal A was converted by the elements noted in Aspect 1, or it can also be a signal B for which signal A was converted by elements not mentioned in Aspect 1.

With the aspect noted above, an instruction value signal and a signal according to the sensor output signal are input to the comparator. Consequently, the signal according to the sensor output signal is reflected by the sensor output signal. However, for the elements other than the comparator, the signal according to the sensor output signal is almost the same value as the instruction value signal is maintained. Thus, for example, if the feedback current generating unit is connected to an input terminal that is a pair with the terminal to which the comparator instruction value signal is input, the feedback current generating unit can obtain almost the same signal as the instruction value signal from that terminal. The "signal according to the instruction value signal" for the feedback current generating unit can also be a signal obtained in this way.

Note that the comparator, the feedback current generating unit, the feedback voltage generating unit, and the synthesis unit are preferably constituted as analog circuits.

[Aspect 2]

A flow control device according to aspect 1, wherein the synthesis unit includes:

a resistor which is connected serially to an output terminal of the feedback voltage generating unit, and is constituted so that the feedback current and the feed forward current flow into the resistor simultaneously.

By using this aspect, it is possible for the synthesis unit to generate at the other terminal of the resistor the second control voltage obtained by adding the voltage according to the sum of the feedback current and the feed forward current to the feedback voltage.

[Aspect 3]

A flow control device according to aspect 1 or 2, wherein the feed forward current generating unit includes:

a CPU that outputs voltage according to the instruction value signal based on predetermined settings, and a resistor that flows the feed forward current according to voltage output by the CPU.

Using this aspect, it is possible to generate as the feed forward current the component for realizing the feed forward control with the valve unit control.

Note that the aspect noted above can be a mode for which the voltage output by the CPU is directly applied to the resistor, and can also be a mode for which the resistor receives application of a voltage from another power source, and the resistor flows a current according to the voltage output by the CPU.

[Aspect 4]

A flow control device according to any of aspects 1 to 3, wherein the flow volume sensor detects the flow volume of the fluid based on a transfer of heat due to the fluid passing through in the flow path.

With this aspect, the flow sensor is slow at reflecting the actual change in the flow volume to the sensor output signal. However, by using the constitution of the aspects noted above, it is possible to stably control the flow volume of the fluid passing inside the flow path while realizing a quick response.

[Aspect 5]

A flow control device according to any of aspects 1 to 4, further comprising:

a first booster unit that boosts the first control voltage to generate a first drive voltage, wherein a wiring that connects the first booster unit and the valve unit is grounded through a voltage dividing circuit, the synthesis unit includes a second booster unit that boosts the second control signal to generate a second drive voltage, and an output terminal of the second booster unit as an output terminal of the synthesis unit is connected to the voltage dividing circuit.

With this aspect, compared to aspects for which the output terminal of the second booster unit is directly connected to the wiring that connects the first booster unit and the valve unit, it is possible to make the second drive voltage generated by the second booster unit a smaller value.

[Aspect 6]

A flow control device according to any of aspects 1 to 5, further comprising:

a differential unit that generates a differential signal including a component obtained by differentiating the sensor output signals, wherein the feedback current generating unit generates the feedback current according to a difference between (i) the differential signal as a signal according to the sensor output signal and (ii) the instruction value signal or a signal according to the instruction value signal.

With this aspect, compared to aspects for which a differential unit is not equipped, and the sensor output signal is received as is at the feedback current generating unit, it is possible to make the response speed of the flow control device faster when reflecting the actual flow volume changes.

[Aspect 7]

A flow control device according to any of aspects 1 to 7, wherein the feedback voltage generating unit includes two or more from among a resistor, a capacitor and a reactor which are serially connected.

With this aspect, by generating the feedback voltage based on the feedback current reflecting the difference between the sensor output signal and the instruction value signal, the feedback voltage generating unit is able to generate feedback voltage that reflects control equipped with any two of the elements of the P component, the I component, and the D component.

[Aspect 8]

A flow control device according to any of aspects 1 to 7 wherein the comparator outputs the first control voltage based on a comparison of (i) the instruction value signal or a signal according to the instruction value signal and (ii) a voltage of an output terminal of the feedback current generating unit as a signal according to the sensor output signal.

Note that by suitably selecting and combining or omitting each constitution of the application examples noted above, it is possible to constitute an invention that is able to resolve the technical problems noted in the specification of this application.

The present invention can be realized in the various modes such as those shown below.

(1) A flow control device, a flow control system, and a flow control method.

(2) A semiconductor manufacturing device, a semiconductor manufacturing system, and a semiconductor manufacturing method.

(3) A computer program for realizing the aforementioned devices and methods.

(4) A recording medium on which is recorded a computer program for realizing the aforementioned devices and methods.

BRIEF DESCRIPTION OF THE DRAWINGS

Following, an embodiment of the present invention will be described using the drawings.

DESCRIPTION OF THE PREFERRED EMBODIMENT

Figure 1:
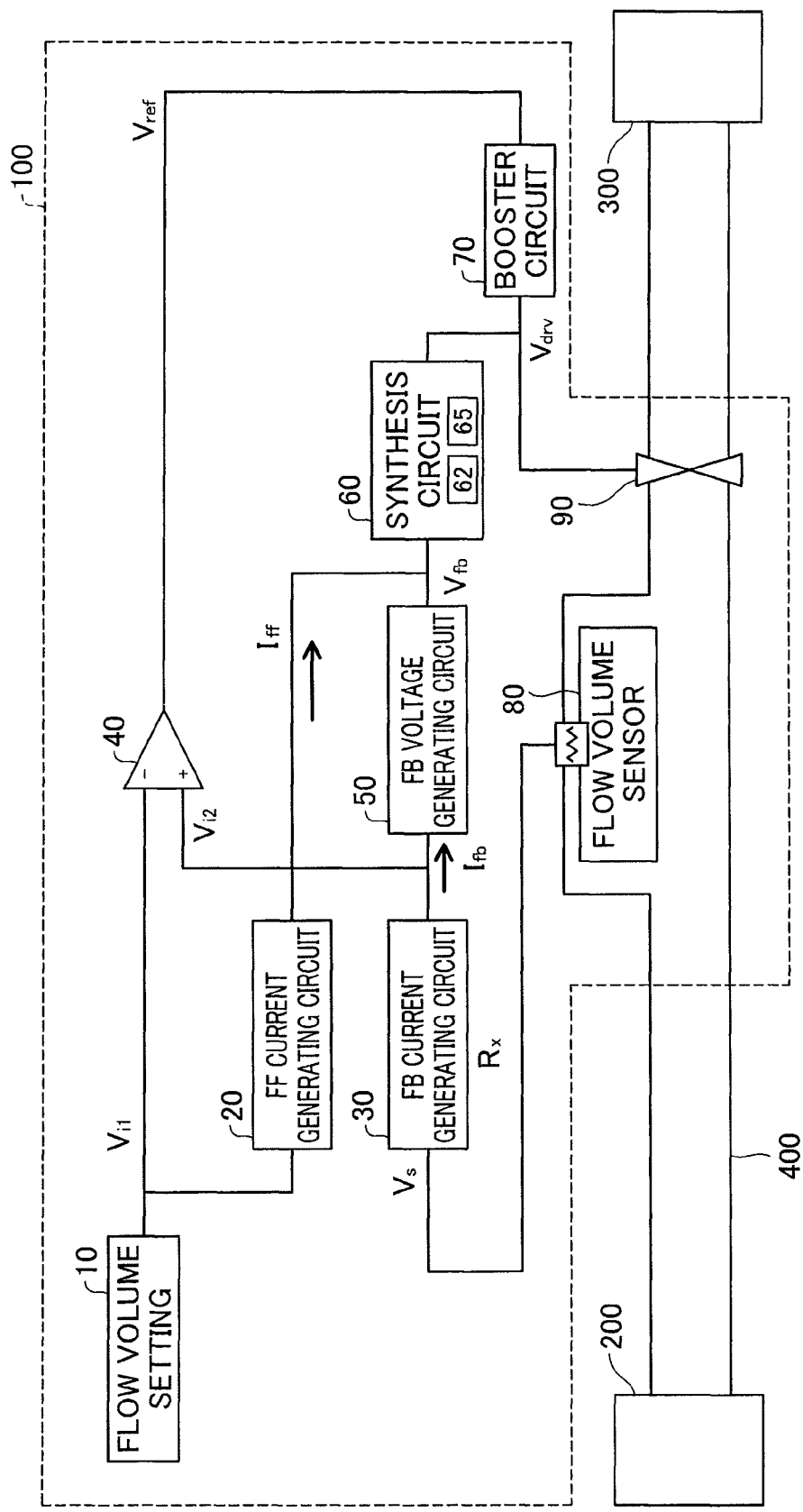
FIG. 1 is a configuration diagram of the flow control device 100 of the first embodiment.

A. First Embodiment:
A1. Flow Control Device Constitution and Operation:

FIG. 1 is a configuration diagram of a flow control device 100 of the first embodiment. A gas source 200 supplies gas of specified components to a semiconductor manufacturing device 300. The flow control device 100 controls the flow volume of this gas.

The flow control device 100 is equipped with a flow volume setting unit 10, a valve unit 90, a flow volume sensor 80, a comparator 40, a first booster circuit 70, a feedback current generating circuit 30, a feedback voltage generating circuit 50, a feed forward current generating circuit 20, and a synthesis circuit 60.

The valve unit 90 controls the circulation of gas through the inside of a flow path 400. The valve unit 90 is equipped with a valve provided inside the flow path 400, and a piezo element that drives that valve. The valve unit 90 has the drive voltage applied, and the degree of openness of the valve is changed by the piezo element. Note that with the valve unit 90, when the drive voltage Vdrv applied to the piezo element is high, the valve opening degree is low, and when the drive voltage Vdrv is low, the valve opening degree is high. By adjusting the valve opening degree, the valve unit 90 is able to control the gas circulation volume that passes inside the flow path 400.

Figure 2:
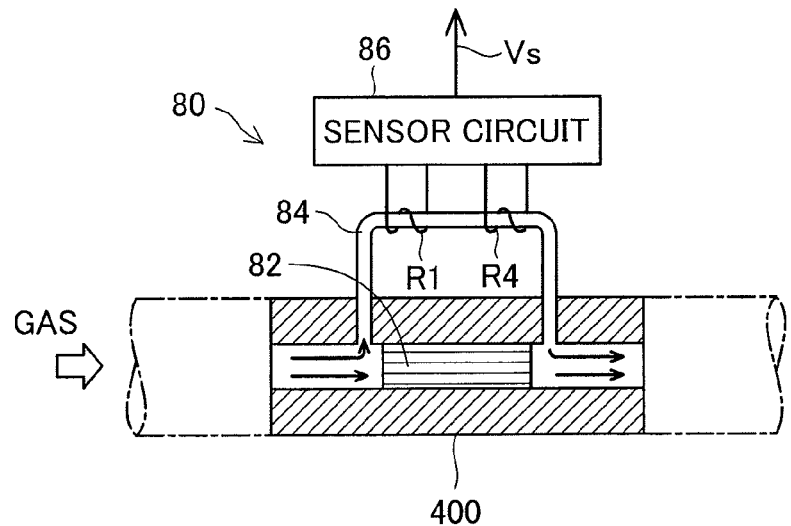
FIG. 2 shows the constitution of the flow volume sensor 80.

FIG. 2 shows the constitution of the flow volume sensor 80. The flow volume sensor 80 outputs a sensor output signal Vs according to the flow volume of gas that passes inside the flow path 400. The size of the sensor output signal Vs is 0 to 5 V. Note that with the description of this embodiment, "the signal" means voltage representing specified information.

The flow volume sensor 80 has within the flow path 400 a bypass tube unit 82 in which gas that flows inside the flow path 400 circulates. A sensor tube 84 is connected to the flow path 400. More specifically, both ends of the sensor tube 84 are connected at positions near both ends of the bypass tube unit 82. Specifically, the sensor tube 84 is constituted so as to detour the bypass tube unit 82 at the flow path 400. The bypass tube unit 82 and the sensor tube 84 are constituted such that (i) a smaller volume of gas flows in the sensor tube 84 than the gas that flows inside the bypass tube unit 82 and (ii) a constant volume ratio of gas flow inside the sensor tube 84 is kept in relation to the gas flow inside the bypass tube unit 82. The gas that circulates inside the flow path 400 circulates in either the bypass tube unit 82 or the sensor tube 84.

Resistance lines R1 and R3 connected mutually in serial are wound onto the surface of the sensor tube 84. The resistance line R4 is wound onto the sensor tube 84 surface further downstream from the flow path than the resistance line R1. The resistance lines R1 and R4 are constituted with materials for which the resistance value changes according to the temperature.

The resistance lines R1 and R4 are made electrically conductive and emit heat. In that state, if it is assumed that gas flows at a mass flow volume Q to the sensor tube 84, the gas captures the heat of the resistance line R1 positioned upstream from the sensor tube 84, and flows to the position at which the downstream resistance line R4 is wound. Then, heat is either transferred to the resistance line R4, or the heat is not captured as much from the resistance line R4 as with the resistance line R1. As a result, a temperature difference occurs between the resistance lines R1 and R4. Consequently, a difference occurs in the resistance values of the resistance lines R1 and R4. This difference in the resistance values of the resistance lines R1 and R4 represents the difference between the potential difference of both ends of the resistance line R1 and the potential difference of both ends of the resistance line R4.

The size of this difference between potential differences is almost proportional to the gas mass flow volume Q. The sensor circuit 86 of the flow volume sensor 80 outputs a signal Vs that has a size proportional to this difference of the potential differences. Also, as described above, the flow volume of gas that flows in the bypass tube unit 82 and the flow volume of the gas that flows in the sensor tube 84 is kept at a fixed ratio. Accordingly, the sensor output signal Vs represents the mass flow volume of the gas that flows inside the flow path 400.

The comparator 40 shown in FIG. 1 receives the instruction value signal Vi1 from the flow volume setting unit 10 via an inverting input terminal. The instruction value signal Vi1 represents the instruction value of the flow volume of gas that passes through the inside of the flow path 400. The size of the instruction value signal Vi1 is 0 to 5 V. The comparator 40 also receives signal Vi2 according to the sensor output signal Vs via a non-inverting input terminal. The size of the signal Vi2 is also 0 to 5 V. Then, the comparator 40 outputs a first control voltage Vref based on a comparison of the instruction value signal Vi1 and the signal Vi2 according to the sensor output signal Vs. When the signal Vi2 is smaller than the instruction value signal Vi1, the first control voltage Vref becomes a positive value. When the signal Vi2 is greater than the instruction value signal Vi1, the first control voltage Vref becomes a negative value. When the signal Vi2 is equal to the instruction value signal Vi1, the first control voltage Vref is 0.

As is well known, the comparator 40 has high input impedance and large gain. Accordingly, when considering the function of the comparator 40, it is acceptable to regard the non-inverting input terminal potential Vi2 as being the same as the inverting input terminal potential Vi1.

The first booster circuit 70 shown in FIG. 1 receives the first control voltage Vref from the comparator 40, boost the first control voltage Vref to generate the first drive voltage Vdrv1. The first drive voltage Vdrv1 is a drive voltage for driving the piezo element of the valve unit 90 at least in part. Note that the first drive voltage Vdrv1 is generated so as to decrease when the first control voltage Vref increases, and to increase when the first control voltage Vref decreases. This is because the valve unit 90 is constituted so that the valve opening degree is smaller when the drive voltage Vdrvis high, and the valve opening degree is greater when the drive voltage Vdrvis low.

The feedback current generating circuit 30 generates a feedback current Ifb according to the difference between the sensor output signal Vs and the signal Vi2 which is the potential of the non-inverting input terminal of the comparator 40. More specifically, the feedback current generating circuit 30 is equipped with a resistor (resistance value Rx) for which one end is connected to the flow volume sensor 80, and the other end is connected to the non-inverting input terminal of the comparator 40 and the feedback voltage generating circuit 50. As a result of the potential of one end of that resistor being Vs and the potential of the other end being Vi2, current Ifb represented by the following formula flows to that resistor. Note that with the current Ifb, the current oriented facing from left to right in FIG. 1 is plus.

[Formula 1]

$$Ifb = \frac{Vs - Vi2}{Rx} \quad (1)$$

Figure 3:
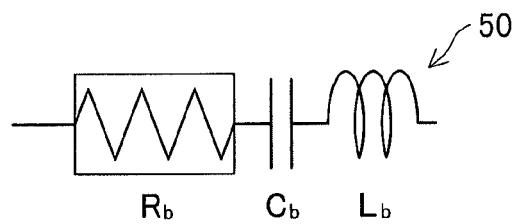
FIG. 3 shows the circuit configuration of the feedback voltage generating circuit 50.

FIG. 3 shows the circuit configuration of the feedback voltage generating circuit 50. The feedback voltage generating circuit 50 (see FIG. 1) generates the feedback voltage Vfb according to the feedback current Ifb. As shown in FIG. 3, the circuit configuration of the feedback voltage generating circuit 50 can be represented by a resistor (resistance value Rb), a capacitor (capacity Cb), and a reactor (inductance Lb) connected serially. The feedback voltage generating circuit 50 is connected to the feedback current generating circuit 30 and the non-inverting input terminal of the comparator 40 (see FIG. 1). Then, since it is possible to think of the input impedance of the comparator 40 as being infinite, current does not flow to the non-inverting input terminal of the comparator 40. Accordingly, the feedback current Ifb flows to the feedback voltage generating circuit 50. The potential difference VD 50 of both ends of the feedback voltage generating circuit 50 is expressed by formula (2) below.

[Formula 2]

$$VD50 = \frac{1}{Cb}\int Ifb dt + Rb \times Ifb + Lb \times \frac{d}{dt} Ifb \quad (2)$$

As shown in FIG. 1, one end of the feedback voltage generating circuit 50 is connected to the non-inverting input terminal of the comparator 40. Accordingly, the potential of that one end of the feedback voltage generating circuit 50 is Vi2. Note that this potential Vi2 is kept at almost the same value as the potential Vi1 of the inverting input terminal by the comparator 40. The potential Vfb of the other end of the feedback voltage generating circuit 50 is expressed by formula (3) below.

[Formula 3]

$$\begin{aligned} Vfb &= Vi2 + VD50 \\ &= Vi2 + \frac{1}{Cb}\int Ifb dt + Rb \times Ifb + Lb \times \frac{d}{dt} Ifb \end{aligned} \quad (3)$$

From formula (1) noted above, formula (3) can be expressed as follows.

[Formula 4]

$$\begin{aligned} Vfb &= Vi2 + \frac{1}{Cb}\int \frac{Vs - Vi2}{Rx} dt + Rb \times \frac{Vs - Vi2}{Rx} + \\ &\quad Lb \times \frac{d}{dt}\left(\frac{Vs - Vi2}{Rx}\right) \\ &= Vi2 + \frac{1}{Cb \times Rx}\int (Vs - Vi2) dt + \frac{Rb}{Rx}(Vs - Vi2) + \\ &\quad \frac{Lb}{Rx} \times \frac{d}{dt}(Vs - Vi2) \end{aligned} \quad (4)$$

The potential Vit is kept at the same value as the potential Vi1 of the inverting input terminal by the comparator 40 (see FIG. 1). Accordingly, formula (4) can be expressed as follows.

[Formula 5]

$$Vfb = \\ Vi1 + \frac{1}{Cb \times Rx}\int (Vs - Vi1) dt + \frac{Rb}{Rx}(Vs - Vi1) + \frac{Lb}{Rx} \times \frac{d}{dt}(Vs - Vi1) \quad (5)$$

From formula (5) means that, with the electric potential Vfb of the feedback voltage generating circuit 50, PID control is performed based on the deviation (Vs-Vi1) between the sensor output signal Vs that represents the actual gas flow volume and the instruction value signal Vi1 that represents the instruction value of the flow volume of the gas that passes inside the flow path 400, and the control is performed such that the sensor output signal Vs follows the instruction value signal Vi1. Here, the P gain is (Rb/Rx), the I gain is {1/(Cb/Rx)}, and the D gain is (Lb/Rx).

Figure 4:
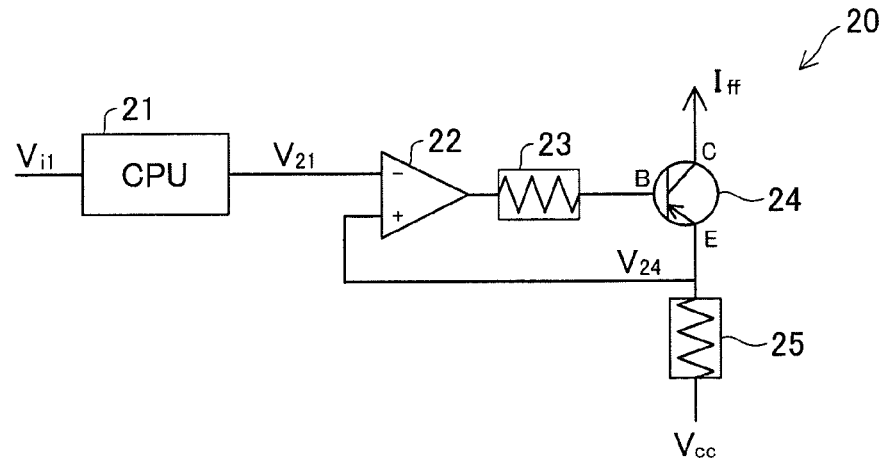
FIG. 4 shows the circuit configuration of the feed forward current generating circuit 20.

FIG. 4 is a drawing showing the circuit configuration of the feed forward current generating circuit 20. The feed forward current generating circuit 20 (see FIG. 1) generates the feed forward current Iff according to the instruction value signal Vi1. As shown in FIG. 4, the feed forward current generating circuit 20 (see FIG. 1) is equipped with a CPU 21, an operating amp 22, a resistor 23, a pnp transistor 24, and a resistor 25 (resistance value R22). A power supply (potential Vcc) is connected to the resistor 25. The collector of the transistor 24 is connected to the synthesis circuit 60 (see FIG. 1).

Figure 5:
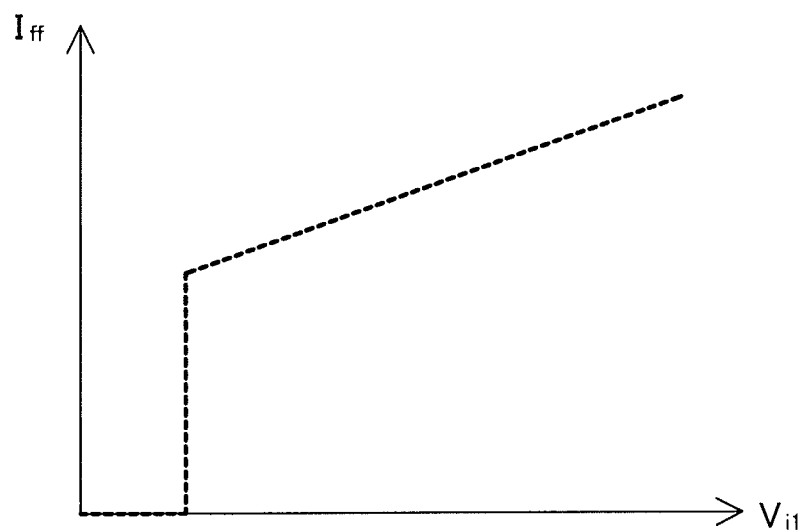
FIG. 5 is a graph showing the size of the feed forward current Iff according to the instruction value signal Vi1.

FIG. 5 is a graph showing the size of the feed forward current Iff according to the instruction value signal Vi1. The feed forward current generating circuit 20 generates a feed forward current Iff such as that in FIG. 5 according to the instruction value signal Vi1. Specifically, when V11 is a specified in a range near 0, the feed forward current Iff is 0, and when Vi1 is in a range greater than the specified range noted above, the feed forward current Iff increases linearly along with an increase in the instruction value signal Vi1. By this kind of non-continuous feed forward current Iff being generated by the CPU 21, both the tightly shut state of the valve unit 90 and the responsiveness of control of the flow volume are established when the instruction value signal Vi1 is near 0. This kind of current control is realized by the CPU 21 as is described later.

Current is not flowed into the non-inverting input terminal of the operating amp 22 of FIG. 4. Accordingly, when the current that flows in the resistor 25 and the transistor 24 emitter-collector is Ix, and the potential between the resistor 25 (resistance value R22) and the transistor 24 is V24, 1x is expressed by the formula (6) below.

[Formula 6]

$$Ix = \frac{Vcc - V24}{R22} \quad (6)$$

The potential V21 of the non-inverting input terminal and the potential V24 of the inverting input terminal are kept at the same value by the work of the operating amp 22. Accordingly, the potential V24 between the resistor 25 and the transistor 24 is the same as the output voltage V21 of the CPU 21. Thus, when wanting to make the current 1x be a desired value Iff, from formula (6), the output voltage V21 of the CPU 21 can be made to the following value.

[Formula 7]

$$V21 = Vcc - (Iff \times R22) \quad (7)$$

Figure 6:
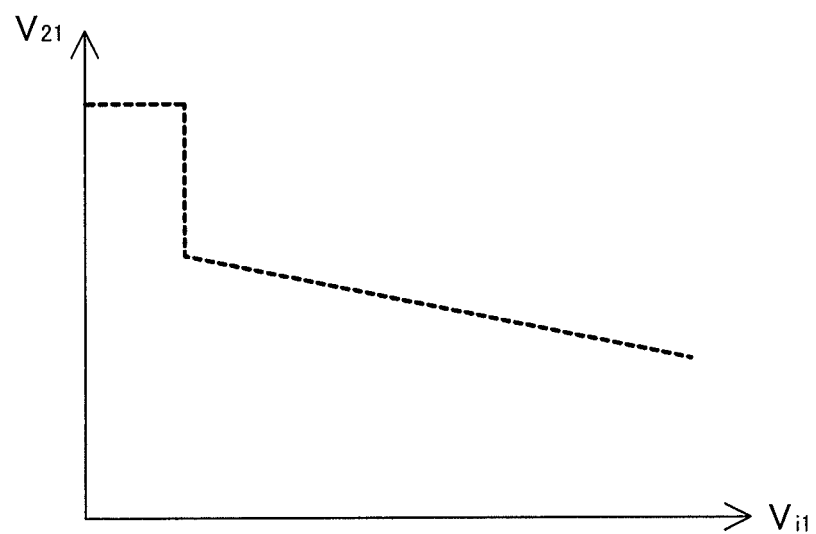
FIG. 6 is a graph of the output voltage V21 of the CPU 21 obtained by applying formula (7) in the graph of FIG. 5.

FIG. 6 is a graph of the output voltage V21 of the CPU 21 obtained by using the formula (7) in the graph of FIG. 5. So that a specified current Iff according to the instruction value signal Vi1 flows based on a predetermined setting (see FIG. 5), the CPU 21 receives the instruction value signal Vi1, converts the signal Vi1, and outputs it as the output voltage 21 (see FIG. 6) to the inverting input terminal of the operating amp 22. To say this another way, the CPU 21 receives the instruction value signal Vi1, and by converting this to output voltage 21 and outputting it, the specified current Iff according to the instruction value signal Vi1 flows. The feed forward current generating circuit 20 outputs a specified feed forward current Iff according to the instruction value signal Vi1 based on a predetermined setting using this kind of constitution and operation.

The synthesis circuit 60 shown in FIG. 1 generates a second control voltage Vdrv* which is a voltage obtained by adding (i) the voltage according to the sum of the feedback current Ifb and the feed forward current Iff and (ii) the feedback voltage Vfb. The second control voltage Vdrv* can use a value of 0 to 15 V, for example.

The synthesis circuit 60 is equipped with a resistor 62 (resistance value Rg) and a second booster circuit 65. The resistor 62 of the synthesis circuit 60 is serially connected to the output terminal of the feedback voltage generating circuit 50 (see FIG. 1). Then, the resistor 62 of the synthesis circuit 60 is also serially connected to the feed forward current generating circuit 20 (see FIG. 1). Accordingly, the feedback current Ifb and the feed forward current Iff flow simultaneously to the resistor 62 of the synthesis circuit 60. As a result, the potential difference VD 60 of both ends of the resistor 62 (resistance value Rg) of the synthesis circuit 60 is expressed by the following formula (8).

[Formula 8]

$$VD60 = Rg \times (Iff + Ifb) \quad (8)$$

The potential of the feedback voltage generating circuit 50 side end of the synthesis circuit 60 is the potential Vfb of the output terminal of the feedback voltage generating circuit 50. Accordingly, from formulas (5) and (8), the potential Vdrv* of the other end of the resistor of the synthesis circuit 60 is expressed by the following formula (9). Note that here, the current oriented facing from left to right in FIG. 1 is plus.

[Formula 9]

$$\begin{aligned}Vdrv^* &= Vfb + VD60 \\ &= Vi1 + \frac{1}{Cb \times Rx}\int (Vs - Vi1)dt + \frac{Rb}{Rx} \times (Vs - Vi1) + \\ &\quad \frac{Lb}{Rx} \times \frac{d}{dt}(Vs - Vi1) + Rg \times (Iff + Ifb)\end{aligned} \quad (9)$$

Ifb is obtained from formula (1), and Vit in formula (1) is equal to Vi1 by the function of comparator 40. Accordingly, the potential Vdrv* of the other end of the resistor of the synthesis circuit 60 is expressed by the following formula (10).

[Formula 10]

$$\begin{aligned}Vdrv^* &= Vi1 + \frac{1}{Cb \times Rx}\int (Vs - Vi1)dt + \frac{Rb}{Rx} \times (Vs - Vi1) + \\ &\quad \frac{Lb}{Rx} \times \frac{d}{dt}(Vs - Vi1) + Rg \times Iff + Rg \times \frac{Vs - Vi1}{Rx} \\ &= Vi1 + \frac{1}{Cb \times Rx}\int (Vs - Vi1)dt + \frac{Rb + Rg}{Rx}(Vs - Vi1) + \\ &\quad \frac{Lb}{Rx} \times \frac{d}{dt}(Vs - Vi1) + Rg \times Iff\end{aligned} \quad (10)$$

The second booster circuit 65 of the synthesis circuit 60 boosts the second control voltage Vdrv* (for example, 0 to 15 V) generated by the resistor 62, and generates the second drive voltage Vdrv2 (for example, 0 to 150 V). The second drive voltage Vdrv2, together with the first drive voltage Vdrv1, is the drive voltage for driving the piezo element of the valve unit 90. Note that the second drive voltage Vdrv2 is generated so as to decrease when the second control voltage Vdrv* increases, and to increase when the second control voltage Vdrv* decreases. This is because the constitution of the valve unit 90 is such that the valve opening degree is small when the drive voltage Vdrv is high, and the valve opening degree is large when the drive voltage Vdrv is low.

The valve unit 90 drives the piezo element using the drive voltage Vdrv based on the second drive voltage Vdrv2 by the synthesis circuit 60 reflecting the second control voltage Vdrv* (see formula (10)) and the first drive voltage Vdrv1 by the first booster circuit 70 reflecting the first control voltage Vref, and changes the valve opening degree. Note that the size of the drive voltage Vdrv is 0 to approximately 150 V, for example.

From formula (10), Vdrv* includes the second to fourth right hand members exhibiting the effect of feedback control (PID) control. Specifically, the flow control device 100 controls the valve unit 90 by reflecting the component that exhibits the feedback control (PID control) effect in the drive voltage Vdrv. Thus, the flow control device 100 of this embodiment is able to perform stable, accurate flow control.

Also, from formula (10), included in Vdrv* is the fifth right hand member (Rg×Iff) that exhibits the effect of feed forward control controlled by the CPU 21 (see FIG. 4) of the feed forward current generating circuit 20. Specifically, the flow control device 100 controls the valve unit 90 by reflecting the component that exhibits the feed forward control effect in the drive voltage Vdrv. Accordingly, the flow control device 100 is able to quickly follow the changes in that instruction value even when there is a sudden change in the gas flow volume instruction value (instruction value signal Vi1).

In more specific terms, when the instruction value signal Vi1 representing the instruction value of the flow volume of the gas passing inside the flow path 400 changes from 0 to a specified value, first, at the stage immediately after the change, the change to the instruction value signal Vi1 is not reflected much in the feedback control. In contrast to this, the second drive voltage Vdrv2 due to the feed forward current generating circuit 20 is controlled by the CPU 21 (see FIG. 4) so as to be a fixed potential according to a specified value of the instruction value signal Vi1. As a result, at the stage immediately after the change in the instruction value signal Vi1, the component of the second drive voltage Vdrv2 due to the feed forward current generating circuit 20 is dominant with the drive voltage Vdrv of the valve unit 90, and exhibits the effect of feed forward control. Accordingly, the flow control device 100 is able to quickly follow the changes in that instruction value even when there is a sudden change in the gas flow volume instruction value.

After that, when the change in the instruction value signal V11 (the difference between the signal Vi2 reflecting the sensor output signal Vs, and the instruction value signal Vi1 after the change) is reflected in the feedback control, the first drive voltage Vdrv1 due to the comparator 40 becomes dominant in the drive voltage Vdrv of the valve unit 90. As a result, a feedback control effect is exhibited by this first drive voltage Vdrv1. Accordingly, with the flow control device 100, even when the actual flow volume may include the deviation in relation to the instruction value due to the device hardware construction or the like, the deviation does not easily remain as a steady deviation. Note that the second drive voltage Vdrv2 due to the feed forward current generating circuit 20 is constant regardless of the passage of time as long as the instruction value signal Vi1 is constant.

Furthermore, with the flow control device 100 of this embodiment, the component in the Vdrv* that exhibits the feedback control effect and the component that exhibits the feed forward control effect are separately generated respectively at the feedback current generating circuit 30 and the feed forward current generating circuit 20 (see FIG. 1). Accordingly, there is no mutual effect given by the component that exhibits the feedback control effect and the component that exhibits the feed forward control effect.

Thus, it is possible to easily synthesize the component that exhibits the feedback control effect and the component that exhibits the feed forward control effect using the synthesis circuit 60. Then, it is possible to independently perform setting of the feedback current generating circuit 30 (specifically, setting of the feedback control) and setting of the feed forward current generating circuit 20 (specifically, setting of the feed forward control). In other words, setting of the feedback current generating circuit 30 and setting of the feed forward current generating circuit 20 are easy. To say this another way, it is possible to perform setting of the feedback control and setting of the feed forward control with a small number of adjustment manhours.

Note that with this embodiment, the flow volume sensor 80 has slow response speed because transference of heat is used for the operating principle (see FIG. 2). Accordingly, when performing the control described above (feedback control and feed forward control) using digital control while using this flow volume sensor 80 as the feedback sensor, because the response of the flow volume sensor 80 is slow in relation to the sampling cycle, it is possible for the system to become unstable. Also, to resolve this kind of instability, when trying to sufficiently eliminate the adverse effect due to the slowness of the response of the flow volume sensor 80, it is not possible to sufficiently increase the control gain set by the feedback voltage generating circuit 50. As a result, the control response speed becomes slower.

Meanwhile, with the flow control device 100 of this embodiment, the feed forward current generating circuit 20 outputs current as the output for reflecting the component of the feed forward control. Then, feedback control and feed forward control are achieved by controlling current and voltage with all of the comparator 40, the feedback current generating circuit 30, the feedback voltage generating circuit 50, and the synthesis circuit 60 as analog circuits. Accordingly, even when the flow volume sensor 80 with the slow response speed is used as the feedback sensor, the system does not become unstable. Unnecessary response slowness is also not included.

A2. Performance of the Flow Control Device:

A comparison of responsiveness is performed for this embodiment and for a comparison example for which feed forward control is not performed. With the comparison example, the feed forward current Iff was made to be 0 without depending on the instruction value signal Vi1. The other points of the comparison example are the same as with this embodiment. On the other hand, with this embodiment, the feed forward current Iff is output as shown in FIG. 5 according to the instruction value signal Vi1.

Figure 7:
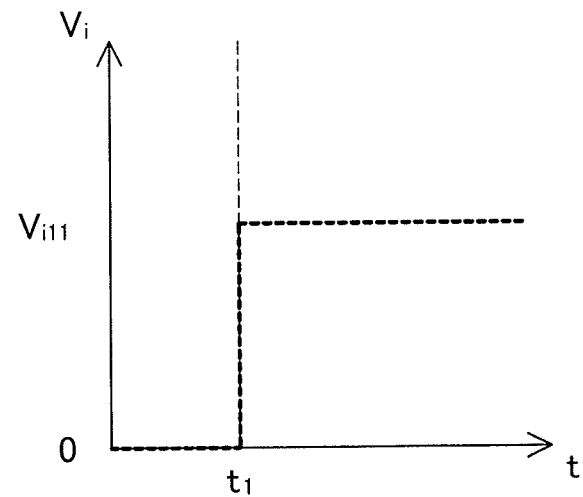
FIG. 7 is a graph representing the instruction value signal Vi1, the drive voltage Vdrv that drives the valve unit 90, and the sensor output signal Vs of the flow volume sensor 80 of a comparison example.
Figure 7:
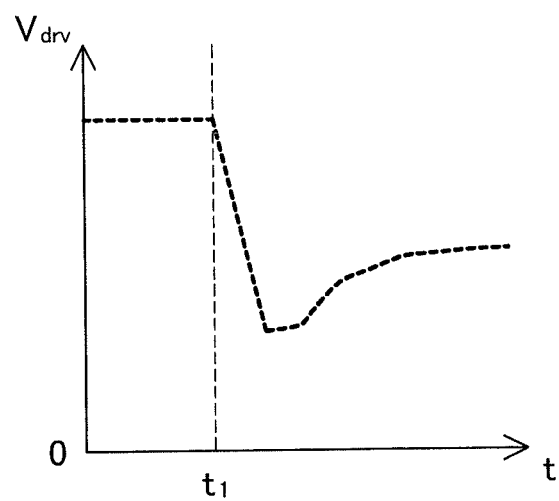
Figure 7:
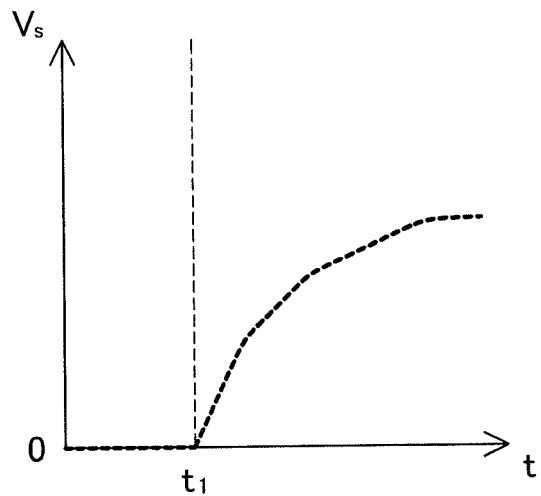
Figure 8:
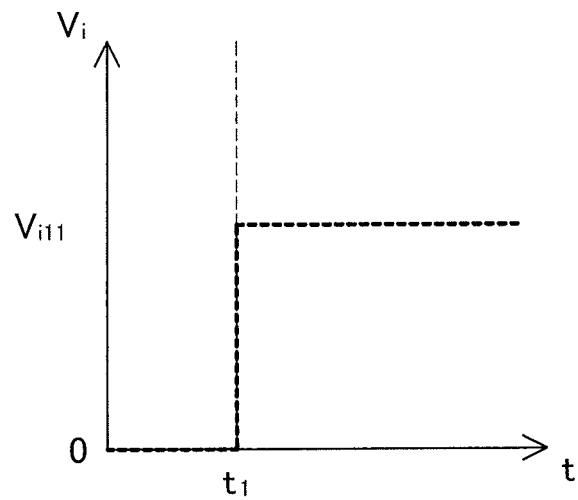
FIG. 8 is a graph representing the instruction value signal Vi1, the drive voltage Vdrv that drives the valve unit 90, and the sensor output signal Vs of the flow volume sensor 80 of this embodiment.
Figure 8:
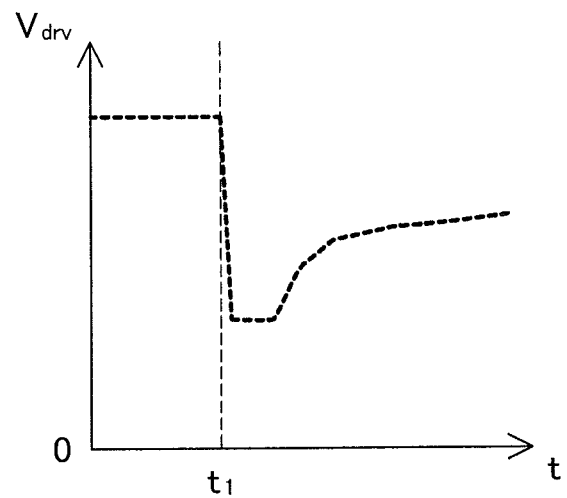
Figure 8:
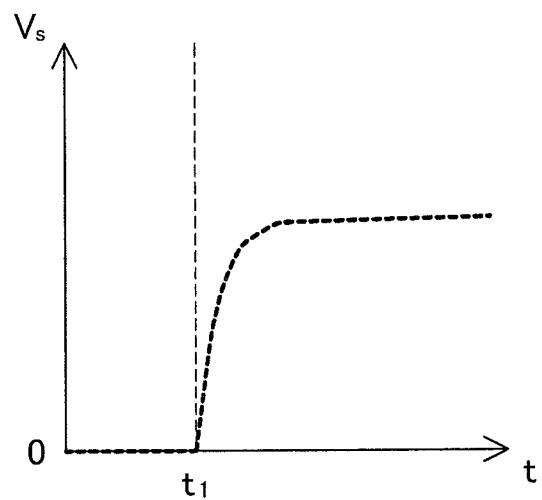

FIG. 7 is a graph showing the comparison example instruction value signal Vi1, the drive voltage Vdrv that drives the valve unit 90, and the sensor output signal Vs of the flow volume sensor 80. FIG. 8 is a graph showing this embodiment's instruction value signal Vi1, the drive voltage Vdrv that drives the valve unit 90, and the sensor output signal Vs of the flow volume sensor 80.

As can be seen from the graph of the instruction value signal Vi1 of the upper level of FIG. 7 and FIG. 8, this test shows the response of the flow control device 100 of this embodiment and the flow control device of the comparison example when the instruction value signal Vi1 at some point in time t1 changes from 0 to Vi11. Note that with this embodiment and the comparison example, the valve unit 90 has a constitution such that the valve opening degree is small when the drive voltage Vdrv is high, and the valve opening degree is large when the drive voltage Vdrv is low. Accordingly, in the graph in FIG. 7 and FIG. 8, the instruction value signal Vi1 (upper level) and the sensor output signal Vs (lower level) of the flow volume sensor 80 are fixed values until time t1, and in the range from the time t1 and thereafter, the instruction value signal Vi1 (upper level) and the sensor output signal Vs (lower level) become greater than up to that time. The drive voltage Vdrv that drives the valve unit 90 is a fixed value until time t1, and in the range from the time t1 and thereafter, the drive voltage Vdrv becomes smaller than up to that time.

As can be seen from the graph of the drive voltage Vdrv of the valve unit 90 at the mid level of FIG. 7 and FIG. 8, with this embodiment, the slope of the change of the drive voltage Vdrv immediately after time t1 is sharper than that of the comparison example. Specifically, the drive voltage Vdrv, in other words the valve opening degree of the valve unit 90, follows more promptly in relation to the change in the instruction value signal Vi1 (see the upper level of FIG. 7 and FIG. 8).

Also, as can be seen from the graph of the sensor output signal Vs of the flow volume sensor 80 of the bottom level of FIG. 7 and FIG. 8, with this embodiment, the slope of the change of the sensor output signal Vs is sharper than that of the comparison example. Also, with this embodiment, a fixed value is reached earlier than with the comparison example. Specifically, with this embodiment, the gas flow volume flowing inside the flow path 400 follows more promptly in relation to the change in the instruction value signal Vi1 (see upper level in FIG. 7 and FIG. 8).

B. Second Embodiment:

The flow control device of the second embodiment differs from the flow control device 100 of the first embodiment in terms of the constitution of the feed forward current generating circuit. The other points of the flow control device of the second embodiment are the same as those of the flow control device 100 of the first embodiment.

Figure 9:
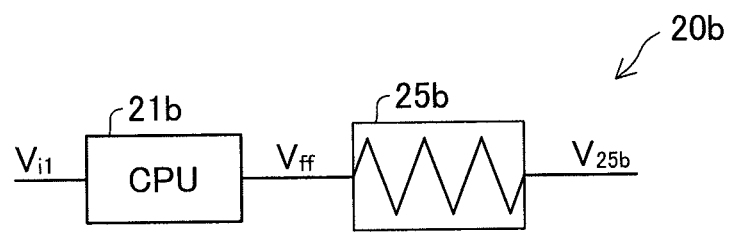
FIG. 9 is a drawing showing the circuit configuration of the feed forward current generating circuit 20b.

FIG. 9 shows the circuit configuration of the feed forward current generating circuit 20b. The feed forward current generating circuit 20b with which the second embodiment flow control device is equipped also generates feed forward current Iff according to the instruction value signal Vi1. As shown in FIG. 9, the feed forward current generating circuit 20b is equipped with a CPU 21b and a resistor 25b (resistance value Rff). At one end of the resistor 25 is connected the output terminal of the CPU 21. At the other end (output terminal) of the resistor 25, the synthesis circuit 60 (see FIG. 1) is connected.

When the current flowing in the resistor 25b is Iff, the potential of the output terminal of the CPU 21b (output voltage of CPU 21b) is Vff and the potential of the output terminal of the resistor 25b is V 25b, Iff is expressed by the following formula (11).

[Formula 11]

$$Iff = \frac{Vff - V25b}{Rff} \quad (11)$$

The output terminal of the resistor 25b is connected to the output terminal of the feedback voltage generating circuit 50 and to the input terminal of the synthesis circuit 60. Accordingly (see FIG. 9 and FIG. 1), the potential V 25b of the output terminal of the resistor 25b is equal to Vfb. Thus, from formula (11), the following formula (12) is obtained.

[Formula 12]

$$Iff = \frac{Vff - Vfb}{Rff} \quad (12)$$

The potential of the input and output terminals of the synthesis circuit 60 is Vfb, and feed forward current Iff and feedback current Ifb flow to the synthesis circuit 60 (see FIG. 1). Thus, the potential Vdrv* of the output terminal of the synthesis circuit 60 (resistance value Rg) is obtained by the following formula (13).

[Formula 13]

$$\begin{aligned} Vdrv^* &= Vfb + (Iff + Ifb) \times Rg \\ &= Vfb + \frac{Vff - Vfb}{Rff} \times Rg + (Ifb \times Rg) \\ &= \left(1 - \frac{Rg}{Rff}\right) \times Vfb + \frac{Rg}{Rff} \times Vff + Ifb \times Rg \end{aligned} \quad (13)$$

Of the right hand members of the aforementioned formula (13), Ifb and Vfb are respectively generated by the feedback current generating circuit 30 and the feedback voltage generating circuit 50 (see FIG. 1). Specifically, with formula (13), the first right hand member including Vfb and the third right hand member including Ifb are components that exhibit the feedback control effect the same as with the first embodiment. Then, the second member including Vff generated by the feed forward current generating circuit 20b is a component that exhibits the feed forward control effect.

Thus, with the flow control device of the second embodiment as well, it is possible to perform stable, accurate flow control using feedback control. Also, using feed forward control, even when there is a sudden change in the gas flow volume instruction value (instruction value signal Vi1), it is possible to rapidly follow the change in that instruction value. Furthermore, it is possible to easily synthesize the component exhibiting the effect of feedback control and the component exhibiting the effect of feed forward control using the synthesis circuit 60. Also, setting of the feedback current generating circuit 30 and setting of the feed forward current generating circuit 20 are easy.

Figure 10:
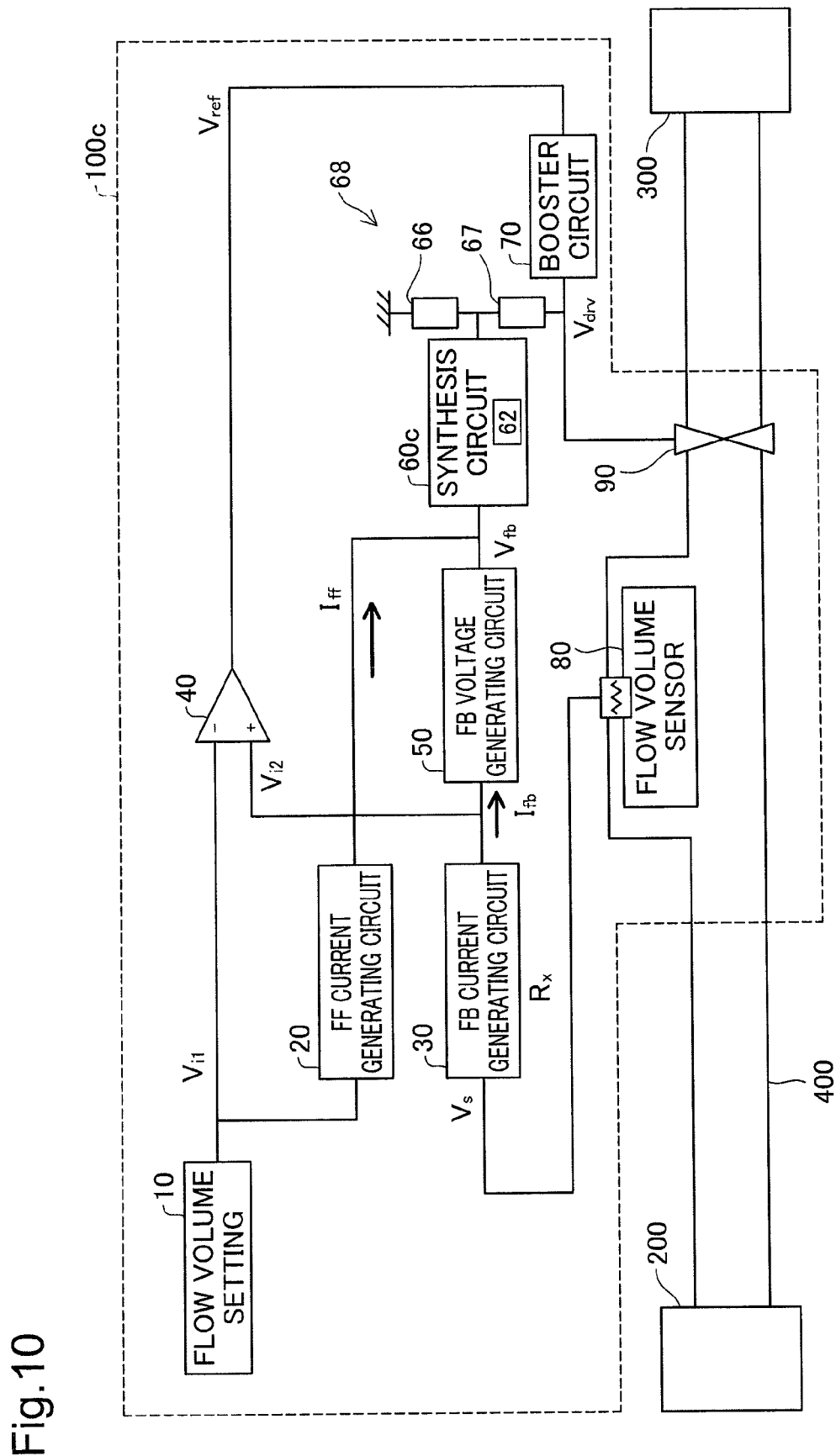
FIG. 10 is a configuration diagram of the flow control device 100c of the third embodiment.

C. Third Embodiment:

FIG. 10 is a configuration diagram of the flow control device 100c of the third embodiment. With the flow control device 100c of the third embodiment, the wiring that connects the first booster circuit 70 and the valve unit 90 is grounded via the voltage dividing circuit 68. Also, the synthesis circuit 60c is not equipped with a second booster circuit 65 internally. Furthermore, the output terminal of the synthesis circuit 60c (said another way, the resistor 62) is connected to the voltage dividing circuit 68. The other points of the flow control device 100c of the third embodiment are the same as the flow control device 100 of the first embodiment.

The voltage dividing circuit 68 has a resistor 66 (resistance value Rd1) and a resistor 67 (resistance value Rd2) mutually connected in serial. The other end of the resistor 66 is grounded. The other end of the resistor 66 is connected to the wiring that connects the first booster circuit 70 and the valve unit 90. The connection part of the resistor 66 and the resistor 67 has the output terminal of the synthesis circuit 60c connected to it.

By using this embodiment, it is possible to make the output voltage Vdrv* of the synthesis circuit 60c (for example, 0 to 15 V) be {(Rd1+Rd2)/Rd1} times. Thus, for example, by making the ratio of the resistance value Rd1 and the resistance value Rd2 be 1:9, it is possible to make the output voltage Vdrv* (0 to 15 V) of the synthesis circuit 60c not equipped with a second booster circuit 65 internally be 10 times, and as a result, it is possible to boost to the second drive voltage Vdrv2 (0 to 150 V). Thus, it is possible to simplify the constitution of the synthesis circuit 60c, and as a result it is possible to make this more compact.

Figure 11:
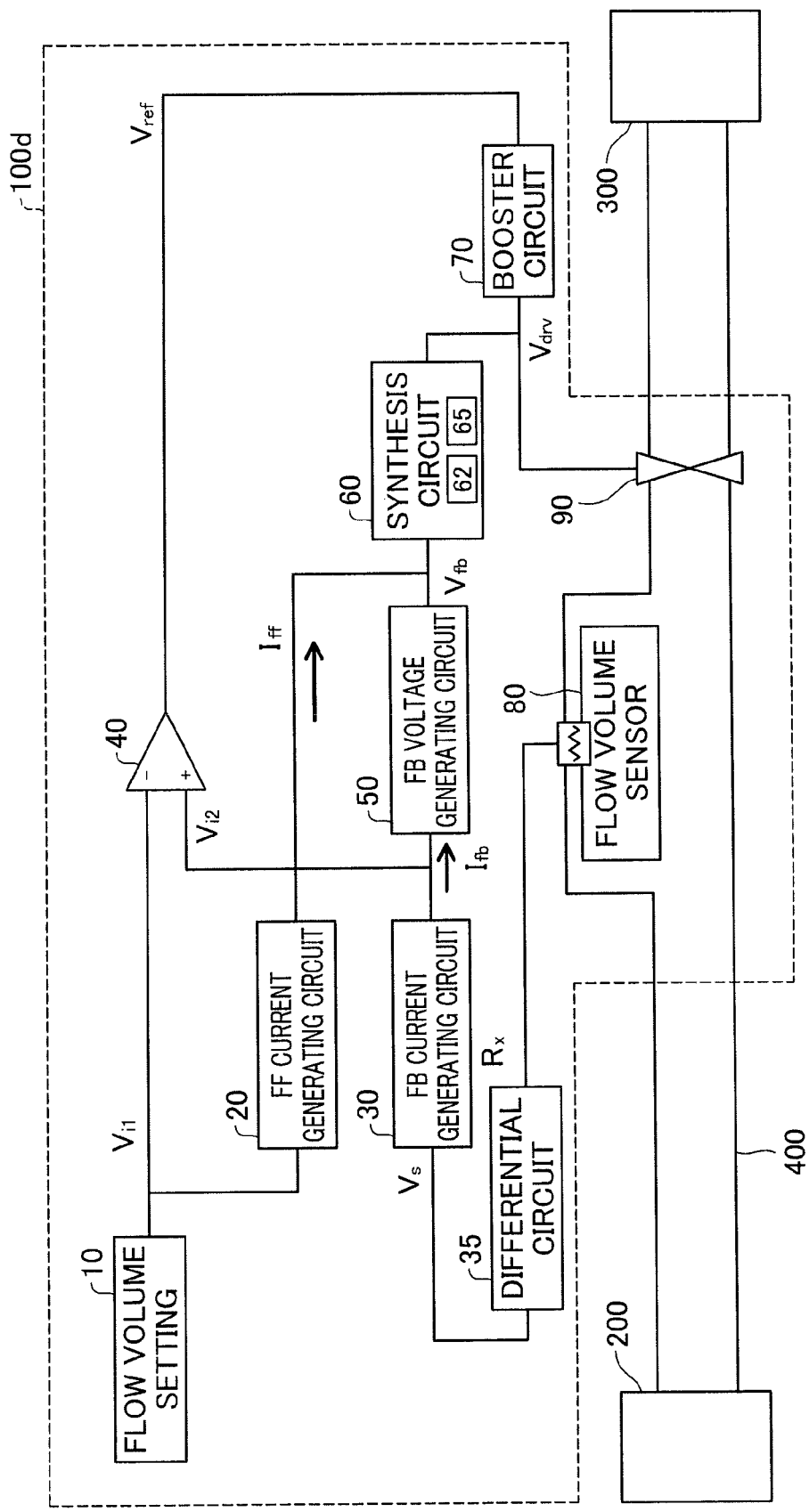
FIG. 11 is a configuration diagram of the flow control device 100d of the fourth embodiment.

D. Fourth Embodiment:

FIG. 11 is a configuration diagram of the flow control device 100d of the fourth embodiment. The flow control device 100d of the fourth embodiment is equipped with a differential circuit 35 between the flow sensor 80 and the feedback current generating circuit 30. The other points of the flow control device 100d of the fourth embodiment are the same as for the flow control device 100 of the first embodiment.

The differential circuit 35 receives the sensor output signal Vs (0 to 5 V) of the flow volume sensor 80, and the signal obtained by differentiating this is supplied to the feedback current generating circuit 30. The feedback current generating circuit 30 generates a feedback current Ifb according to the difference between the signal received from the differential circuit 35 and the potential Vi2 of the non-inverting input terminal of the comparator 40 (equal to the instruction value signal Vi1).

By using this embodiment, compared to the flow control device 100 of the first embodiment, the change in the feedback current Ifb reflecting the change in the actual flow volume is sudden. As a result, compared to the response speed of the flow control device 100d, it is possible to make the response speed of the flow control device 100d when reflecting the actual flow volume change even faster.

E. Variations:

Note that this invention is not limited to the aforementioned embodiments and modes of implementation, but can also be implemented in various modes in a range that does not stray from its gist, for example the following variations are possible.

E1. Variation 1:

With the aforementioned embodiments, we described the present invention with an example of a flow control device that controls the flow volume of gas supplied to a semiconductor manufacturing device. However, the present invention is not limited to gases, but can also be used for flow control devices that control the flow volume of any fluid, such as liquids or the like.

E2. Variation 2:

With the aforementioned embodiment, the flow volume sensor is the flow volume sensor 80 that uses the transfer of heat by a fluid. However, the flow volume sensor can also be a sensor based on another principle, such as an item that uses the force of a fluid or the like. However, the technology of each of the aforementioned embodiments is particularly effective when the response speed of the flow volume sensor is slow.

E3. Variation 3:

With the aforementioned embodiments, the valve is operated by a piezo element. However, it is also possible to use a mode for which another mechanism of the valve unit operates the valve and changes the valve opening degree using hydraulic pressure, a motor, or the like, for example.

E4. Variation 4:

With the aforementioned embodiments, the comparator 40 outputs a positive value first control voltage Vref when the signal Vi2 is smaller than the instruction value signal Vi1, and outputs a negative first control voltage Vref when the signal Vi2 is greater than the instruction value signal Vi1. Then, when the signal Vi2 is equal to the instruction value signal Vi1, the first control voltage Vref is 0. However, as long as the mode is such that the comparator 40 is able to output the first control voltage according to the characteristics of the valve unit 90 which is the subject of control based on a comparison of the first input signal and the second input signal, it can also be a different mode. For example, the aforementioned mode can have the code of the output voltage Vref be reversed, and/or the voltage output when the two input values are equal can also be a specified value other than 0.

E5. Variation 5:

Though not clearly shown in FIG. 1, FIG. 10, and FIG. 11, the flow control device can also be equipped with a drive voltage generating unit that generates the drive voltage Vdrv according to the first control voltage Vdrv1 and the second control voltage Vdrv2. The drive voltage generating unit receives the first control voltage Vdrv1 and the second control voltage Vdrv2, and can generate a drive voltage Vdrv for which the voltage is higher than Vdrv1 and Vdrv2. Also, after respectively boosting the first control voltage Vdrv1 and the second control voltage Vdrv2, the drive voltage generating unit can generate the drive voltage Vdrv by synthesizing these using a specified method.

E6. Variation 6:

With the aforementioned fourth embodiment, the signal obtained by differentiating the sensor output signal Vs generated by the differential circuit 35 is given to the feedback current generating circuit 30. However, the signal given to the feedback current generating circuit 30 is not limited to this kind of mode. However, the signal given to the feedback current generating circuit 30 is preferably a signal that includes a component obtained by differentiating the sensor output signal Vs, such as a signal that can be obtained by adding a specified component to a component obtained by differentiating the sensor output signal Vs or the like.

E7. Variation 7:

With the aforementioned embodiments, the feed forward current generating circuit uses a circuit configuration like that shown in FIG. 4 and FIG. 9. However, as long as the feed forward current generating circuit is a circuit that can generate the predetermined feed forward current according to the instruction value signal, it is possible to use any circuit. Also, the predetermined setting can be an item according to a map or can also be an item given using a formula.

Also, the feedback current generating unit is not limited to the constitution described with the embodiments, but can also use any constitution as long as it is a constitution that can generates feedback current according to the difference between the sensor output signal or a signal according to the sensor output signal, and a signal according to the instruction value signal. Then, the feedback voltage generating unit is also not limited to the constitution described with the embodiments, but can be any constitution as long as it is a constitution that can generate the feedback voltage according to the feedback current. Also, the synthesis unit is not limited to the constitution described with the embodiments, but can be any constitution as long as it is a constitution that can generate a second control voltage that is a voltage for which a voltage according to the sum of the feedback current and the feed forward current is added to the feedback voltage. However, it is preferable to constitute the feedback current generating unit, the feedback voltage generating unit, and the synthesis unit as analog circuits.

Also, the mode of connecting each constitutional element is not limited to the modes noted in the embodiments, and any mode can be used as long as it is a mode that can exhibit the functions of each of the constitutional elements.

E8. Variation 8:

With the aforementioned third embodiment, the synthesis circuit 60c is not equipped with a second booster circuit 65. However, with a mode for which the syntheses circuit 60c is equipped with a second booster circuit 65 like with the first embodiment, it is possible to further equip a voltage dividing circuit such as the voltage dividing circuit 68 of the second embodiment. By using that kind of mode, it is possible to make the size of the second drive voltage generated by the second booster circuit 65 be $\{Rd1/(Rd1+Rd2)\}$ compared to the first embodiment. Thus, it is possible to simplify the constitution of the synthesis circuit 60c, and as a result, to make this more compact. Note that with this kind of mode, it is possible to determine any suitable value for the value of the resistance values Rd1 and Rd2.

E9. Variation 9:

By suitably selecting and combining or omitting each constitution of each of the aforementioned embodiments, it is possible to constitute an invention that can resolve the technical problems noted in the specification of this application. It is also possible to add constitutional elements that are not noted in each of the aforementioned embodiments to constitute the invention.

What is claimed is:

1. A flow control device, comprising:
    a valve unit that controls a flow of a fluid inside a flow path;
    a flow volume sensor that outputs a sensor output signal according to a flow volume of the fluid;
    a comparator that receives (i) an instruction value signal expressing the instruction value of the flow volume of the fluid as a first input signal and (ii) a signal according to the sensor output signal as a second input signal, and outputs a first control voltage based on a comparison of the first and second input signals;
    a feedback current generating unit that generates a feedback current according to a difference between (i) the sensor output signal or a signal according to the sensor output signal and (ii) a signal according to the instruction value signal;
    a feedback voltage generating unit that generates a feedback voltage according to the feedback current;
    a feed forward current generating unit that generates a feed forward current according to the instruction value signal; and
    a synthesis unit that generates a second control voltage that is a voltage obtained by adding to the feedback voltage a voltage according to a sum of the feedback current and the feed forward current, wherein
    the valve unit is controlled according to the first control voltage and the second control voltage.

2. A flow control device according to claim 1, wherein the synthesis unit includes:
    a resistor which is connected serially to an output terminal of the feedback voltage generating unit, and is constituted so that the feedback current and the feed forward current flow into the resistor simultaneously.

3. A flow control device according to claim 1, wherein the feed forward current generating unit includes:
    a CPU that outputs voltage according to the instruction value signal based on predetermined settings, and
    a resistor that flows the feed forward current according to voltage output by the CPU.

4. A flow control device according to claim 1, wherein the flow volume sensor detects the flow volume of the fluid based on a transfer of heat due to the fluid passing through in the flow path.

5. A flow control device according to claim 1, further comprising:
    a first booster unit that boosts the first control voltage to generate a first drive voltage, wherein
    a wiring that connects the first booster unit and the valve unit is grounded through a voltage dividing circuit,
    the synthesis unit includes a second booster unit that boosts the second control signal to generate a second drive voltage, and
    an output terminal of the second booster unit as an output terminal of the synthesis unit is connected to the voltage dividing circuit.

6. A flow control device according to claim 1, further comprising:
    a differential unit that generates a differential signal including a component obtained by differentiating the sensor output signals, wherein
    the feedback current generating unit generates the feedback current according to a difference between (i) the differential signal as a signal according to the sensor output signal and (ii) the instruction value signal or a signal according to the instruction value signal.

7. A flow control device according to claim 1, wherein the feedback voltage generating unit includes two or more from among a resistor, a capacitor and a reactor which are serially connected.

8. A flow control device according to claim 1 wherein the comparator outputs the first control voltage based on a comparison of (i) the instruction value signal or a signal according to the instruction value signal and (ii) a voltage of an output terminal of the feedback current generating unit as a signal according to the sensor output signal.

* * * * *